(12) United States Patent
McBrearty

(10) Patent No.: US 7,191,297 B2
(45) Date of Patent: Mar. 13, 2007

(54) METHOD FOR VOLUME MANAGER TO HAVE CONFIGURABLE DEVICE TYPE AND SUBTYPE FOR APPLICATION USE

(75) Inventor: Gerald Francis McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 10/674,976

(22) Filed: Sep. 30, 2003

(65) Prior Publication Data

US 2005/0071555 A1    Mar. 31, 2005

(51) Int. Cl.
*G06F 12/00* (2006.01)
(52) U.S. Cl. ...................................................... 711/154
(58) Field of Classification Search ...................... None
See application file for complete search history.

(56) References Cited

U.S. PATENT DOCUMENTS

| | | | |
|---|---|---|---|
| 5,546,557 A | * | 8/1996 | Allen et al. ................. 711/111 |
| 5,566,331 A | * | 10/1996 | Irwin et al. ................... 707/10 |
| 5,897,661 A | * | 4/1999 | Baranovsky et al. ........ 711/170 |
| 6,574,705 B1 | | 6/2003 | Peloquin et al. ............ 711/114 |
| 2002/0073242 A1 | | 6/2002 | Peloquin et al. ............ 709/313 |
| 2003/0023811 A1 | | 1/2003 | Kim et al. .................. 711/114 |
| 2003/0023826 A1 | * | 1/2003 | McMichael et al. ........ 711/173 |
| 2003/0163578 A1 | * | 8/2003 | Gao ........................... 709/230 |

* cited by examiner

*Primary Examiner*—Gary Portka
*Assistant Examiner*—Duc T. Doan
(74) *Attorney, Agent, or Firm*—Duke W. Yee; Marilyn Smith Dawkins; Wayne P. Bailey

(57) ABSTRACT

A method, system, and apparatus for controlling the behavior of an application through a device or device subtype in a logical volume manager. The present invention allows for creating device types or subtypes to be used when creating a logical volume. The device type or device subtype specified during the creation of the logical volume signals to an application that the application may perform a particular behavior. The use of alternate device types and subtypes when creating a logical volume inform an application that the application can behave in a new way defined by the device type and subtype.

23 Claims, 3 Drawing Sheets

METHOD FOR VOLUME MANAGER TO HAVE CONFIGURABLE DEVICE TYPE AND SUBTYPE FOR APPLICATION USE

BACKGROUND OF THE INVENTION

1. Technical Field

The present invention relates to data processing systems, and further to a method and data processing system including a logical volume manager. More particularly, the present invention provides a method and data processing system for configuring a device type or device subtype to allow an application to control behavior changes via the device type or device subtype.

2. Description of Related Art

Direct access storage devices (DASD) are widely used in mainframe computer systems to store data. In order to manage these direct access storage devices, several disk management techniques are currently available. One useful and popular technique is logical volume management. Instead of interfacing directly with a physical partition on the direct access storage device, a logical volume manager (LVM) divides the disk space on the drive into logical partitions. A logical partition may include several direct access storage devices but is transparent to a user. In other words, the logical partition appears as a single storage device to the user.

At the lowest level of logical volume management is the physical direct access storage device itself. Each individual direct access storage device is formatted into a physical volume (PV) for use by the LVM. Each physical volume has a name and belongs to a volume group (VG). A volume group is a collection of direct access storage devices under the management of the LVM that are treated as a single large storage area. All physical volumes within a volume group are divided into physical partitions (PPs) of a certain size. These physical partitions are allocatable units of disk space, typically on the order of 2 megabytes or 4 megabytes. The total number of physical partitions on each direct access storage device varies and depends on the total capacity of the direct access storage device.

Each volume group defines one or more logical volumes (LVs). Logical volumes are groups of information located on physical volumes. Although data on a physical volume can be discontinuous, the data on a logical volume appears to the user as contiguous. This arrangement permits file systems, paging space and other logical volumes to be resized or relocated, span multiple physical volumes and have their contents replicated for greater flexibility and availability in data storage.

Multiple logical volumes can be created for each volume group. Creating a logical volume requires certain information to be entered into the logical volume manager. For example, the LVM requires that each new logical volume have a specified file system type. The specified file system type is stored in the logical volume control block (LVCB), which includes in-band data (data located within the logical volume) of the LVM. The logical volume control block is the first 512 bytes of a logical volume.

The LVCB contains information such as the creation date of the logical volume, information about mirrored copies, and possible mount points in the journaled file system. Once a logical volume is created, the device type or subtype specified for the particular logical volume cannot be changed for the life of the logical volume.

Although the LVM allows storage drive space to be added or expanded while the system is running, applications have traditionally skipped over the LVCB area when laying down data. Applications exclude the LVCB area when writing data in order to retain the configuration information contained within the LVCB. However, the configuration information stored in the LVCB may not be critical information and may be overwritten without negatively affecting the LVM.

One problem with excluding the LVCB from being written over is that skipping over the LVCB area causes alignment problems with the underlying physical storage. For example, a logical volume manager may use striped logical volumes to increase I/O efficiency. Striping spreads the consecutively ordered data, such as a file, in a logical volume across several disk drives, in such a way that the I/O capacity of the disk drives can be used in parallel to access data on the logical volume. In a striped logical volume, the data addresses follow the sequence of stripe units rather than the data blocks themselves. A complete stripe consists of one stripe unit on each of the physical device that contains part of the striped logical volume. Excluding the LCVB when using striped logical volumes can create alignment problems when writing to more than one device, for example, if an application skips 4K at the beginning of the logical volume and then performs a 64K write/read on the striped logical volume. The application will write/read 60K from a first disk, and use a second disk to service the additional 4K. If the 60K and 4K writes are not serviced at the same time, data within the block may become inconsistent between the 60K write and the 4K write.

Another problem with preventing the overwriting of the LVCB is that the application does not know where to start laying down its own data. For example, if the LVCB data is to be retained in the first 4K of the logical volume and the LVCB needs to be updated to reflect a move in data storage from one location to another, the offset for the logical volume will be set to zero in order to allow the application to write over the LVCB. Since the application traditionally skips the LVCB area, having the offset switched to zero and writing over the LVCB data will cause the application to think that its data is corrupted.

Thus, it would be advantageous to have a method, system, and apparatus for allowing the specification of a new device type and device subtype to indicate to an application that the application does not need to skip over the LVCB. It would also be advantageous to have a method, system, and apparatus for using the new alternate device type and subtype to signal to an application to behave in a new way. Moreover, it would be advantageous to allow an application to supply a new alternate device type or subtype in order to manage and control behavioral changes via the device type or subtype.

SUMMARY OF THE INVENTION

The present invention provides a method, system, and apparatus for controlling the behavior of an application through a device or device subtype in a logical volume manager. The device or device subtype specified during the creation of the logical volume is used to signal to an application tat the application can perform a particular behavior. For example, the logical volume manager allows a device or device subtype to be specified when creating a logical volume. The particular device type or subtype specified during logical volume creation may signal to an application that the application, when writing data to a storage device, may write data to the LVCB area within the logical volume. Thus, the application may overwrite the metadata contained within the LVCB. Normally, an application will skip over the LVCB area of the logical volume. The present invention allows for creating device types or subtypes to be used when creating a logical volume. These alternate device types and subtypes provide a signal to an application that the application can behave in a new way defined by the device type and subtype.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method, system, and apparatus for controlling the behavior of an application through a device or device subtype in a logical volume manager. More specifically, the present invention provides a mechanism for allowing the device or device subtype specified during the creation of the logical volume to signal to an application that the application can perform a particular behavior. For example, the selected device type or subtype may indicate to an application, such as a database, that the application, when writing data to a storage device, is allowed write data to the LVCB area within the logical volume. Normally, an application is prevented from writing data to the LCVB area of the logical volume since the LVCB area contains configuration information, and instead will skip over the LVCB.

The present invention allows the selection of a device type or device subtype to control the behavior of the application. For example, the new type can signal an application to overwrite the metadata contained within the LVCB. In addition, selection of a type can signal to an application to prevent older versions of the application from using the logical volume on other machines, since disks can be moved from one machine to another. The application, such as a database or file system, may also use the new type to signal to the application that a new function can be used.

Alternatively, the application may use the new type to reduce the currently supported feature set. This behavioral control is useful for applications that run on multiple levels of the same operating system in order to have applications that can run on the same code with different code paths on the same machine but get different behavior on different logical volumes. Furthermore, an application may use the new type to test its own expected behavior on a different volume manager, without having to test on that volume manager.

Alternatively, selection of a device type or device subtype to control the behavior of the application may be set at creation time such that this property would be non-changeable for the life of the logical volume.

The mechanisms of the present invention may be employed in a distributed data processing system or in a stand-alone computing device. As such, in order to provide a context for the description of the operational components of the present invention, a brief description of a distributed data processing system and a stand-alone data processing system are provided hereafter with reference to FIGS. 1–3.

Figure 1:
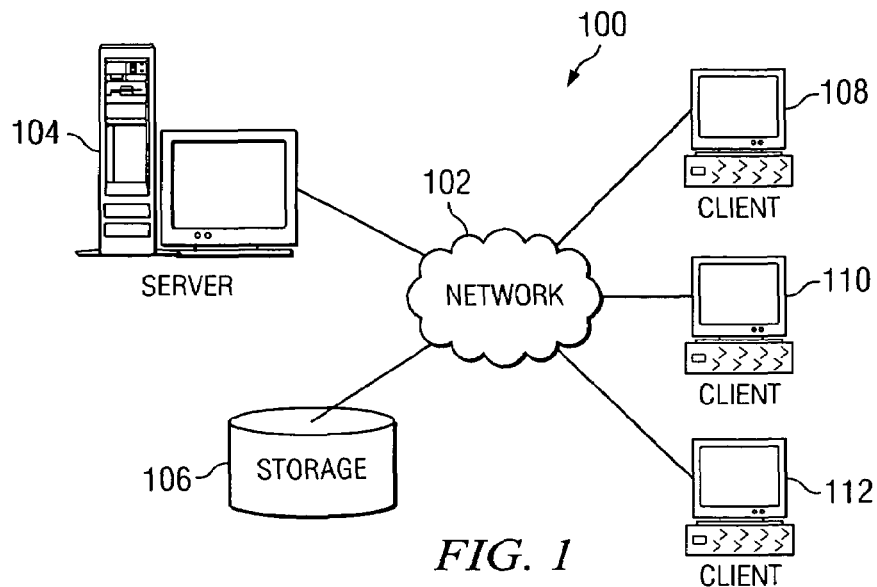
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
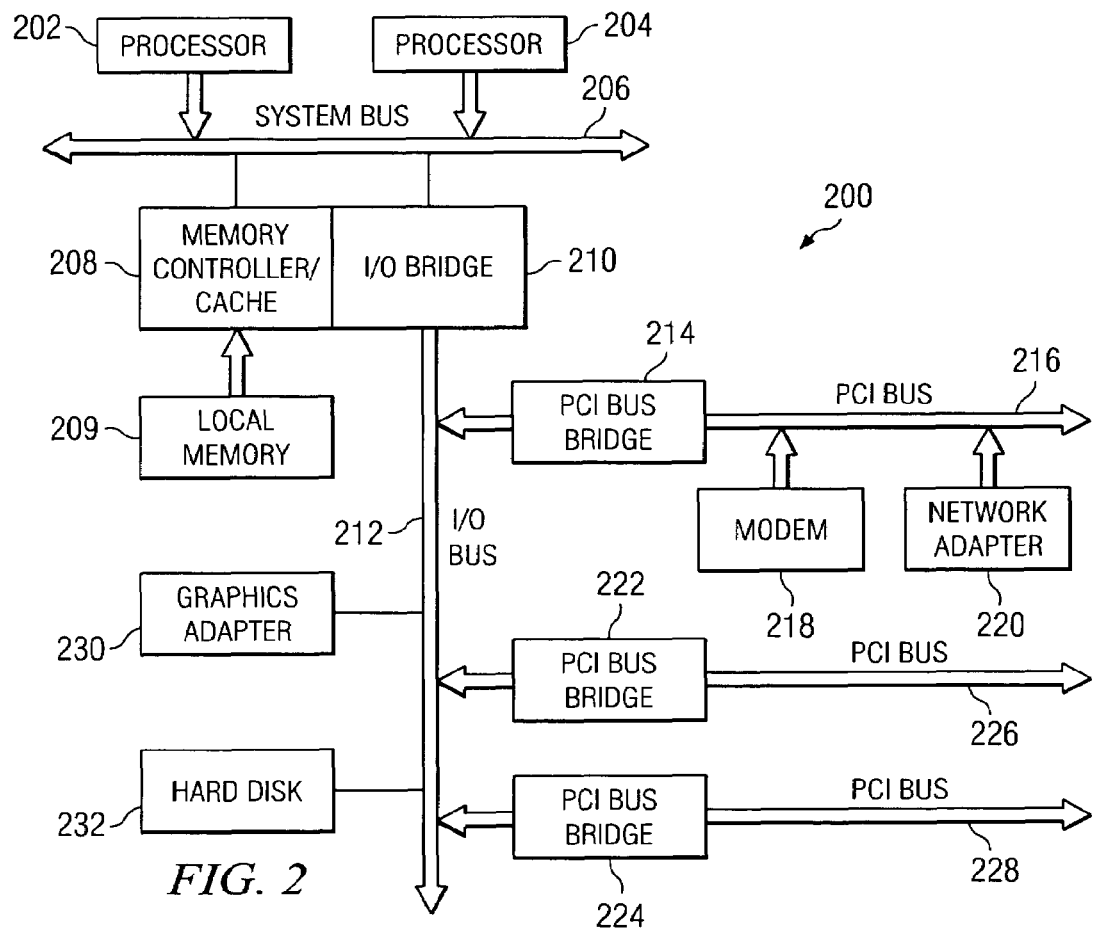
FIG. 2 is an exemplary diagram of a server data processing device in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
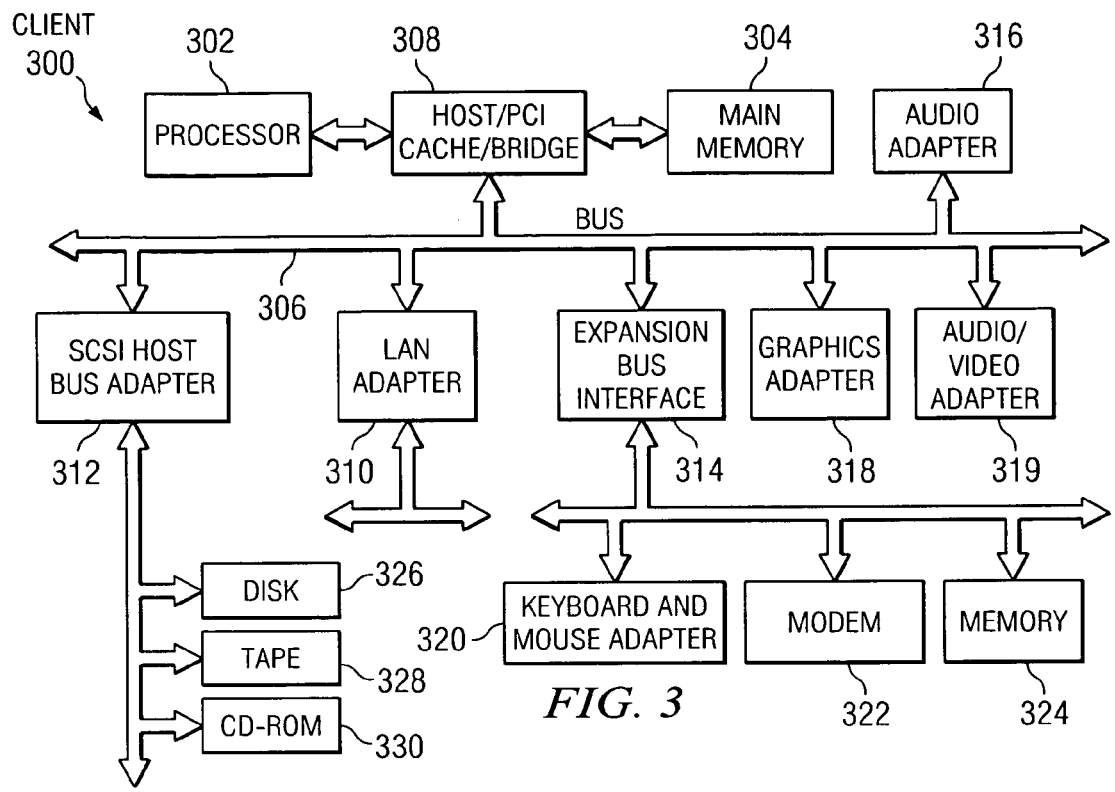
FIG. 3 is an exemplary diagram of a client of standalone data processing device in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface. As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
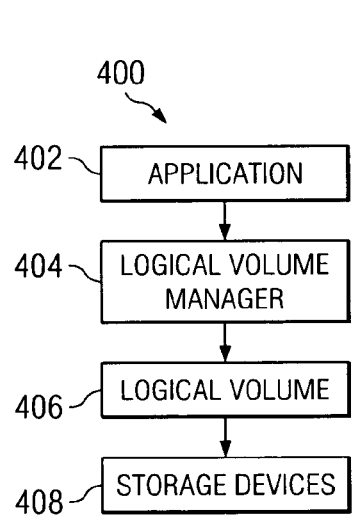
FIG. 4 is a conceptual view of a logical volume management system.

FIG. 4 is a general block diagram illustrating a conceptual view of a logical volume management system in accordance with a preferred embodiment of the present invention. In general, logical volume management system 400 of the present invention includes an application 402 that runs on data processing system 100 shown in FIG. 1. Application 402 reads from and writes to logical volume manager 404, which in turn controls logical volumes 406 by reading and writing to the partitions on direct access storage devices 408 that represent each of logical volumes 406.

Figure 7:
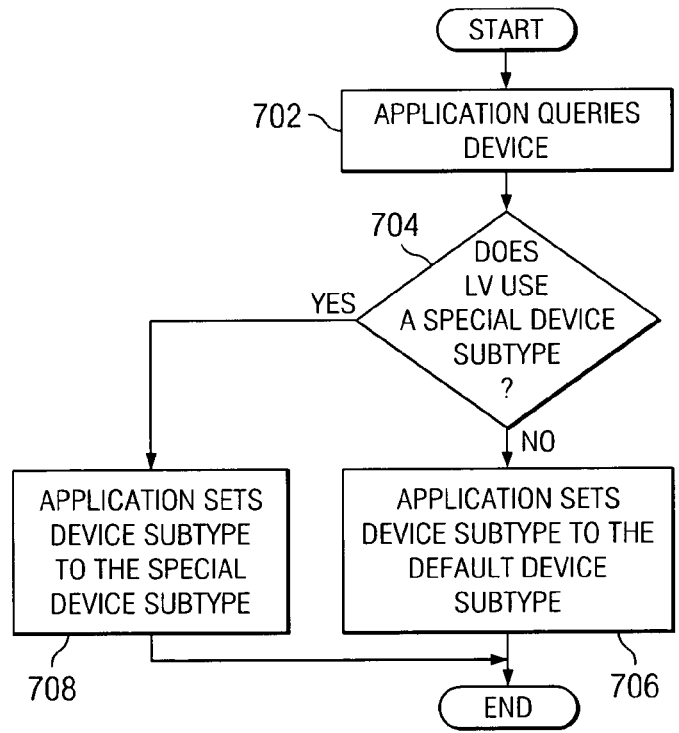
FIG. 7 is a flowchart outlining an exemplary operation of a preferred embodiment of the present invention with regard to querying the device to determine what code paths the application will use for a specific device.
Figure 5:
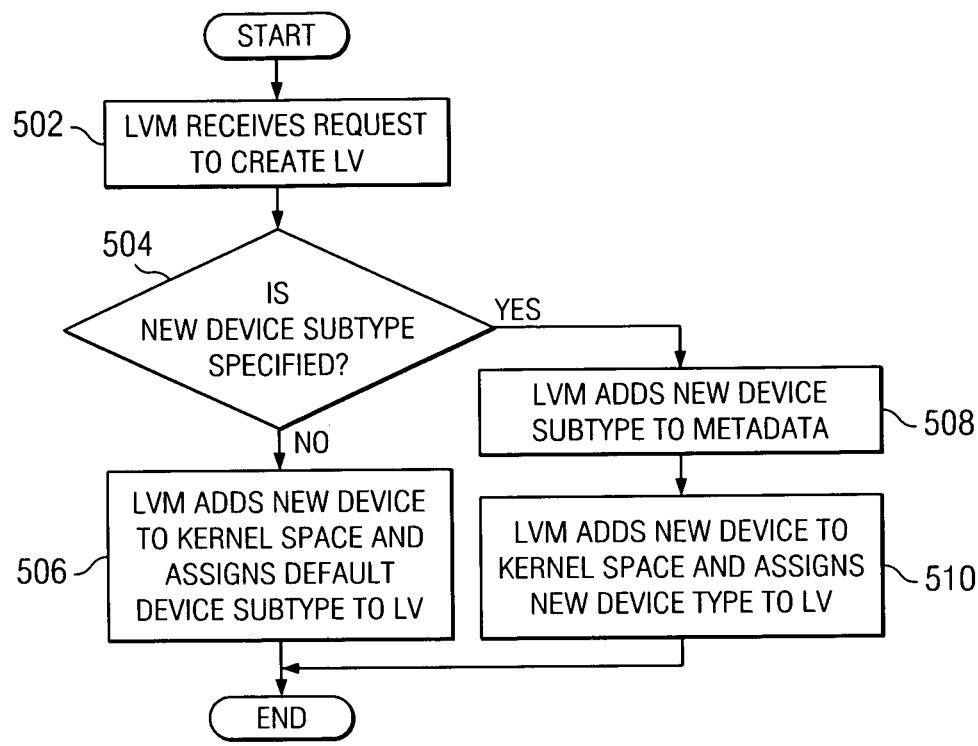
FIG. 5 is a flowchart outlining an exemplary operation of a preferred embodiment of the present invention with regard to creating a logical volume.
Figure 6:
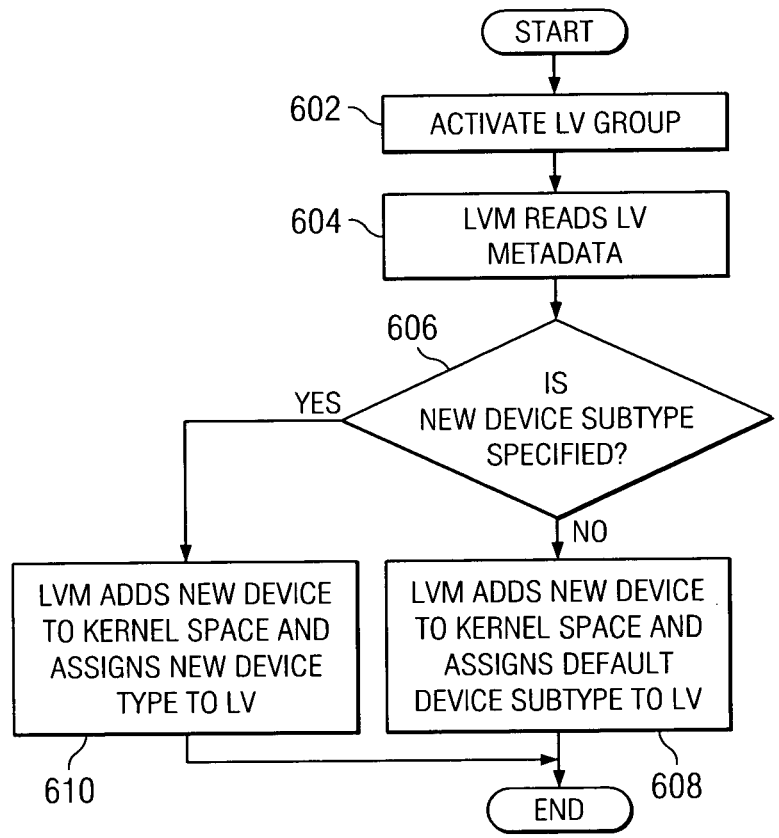
FIG. 6 is a flowchart outlining an exemplary operation of a preferred embodiment of the present invention with regard to activating a volume group.

FIGS. 5–7 are detailed flow diagrams illustrating processes used in a preferred embodiment of the present invention. It should be noted that the present invention may be implemented in a variety of ways and actual implementation may vary from the following description.

With reference now to FIG. 5, a detailed flow diagram of the creation of a logical volume according to a preferred embodiment of the present invention is shown. The logical volume appears to users as a single contiguous disk volume, even though the logical volume may reside on noncontiguous physical partitions or on more than one physical volume. Logical volumes may be created after creating a volume group. A logical volume may be created using a command. The command may create a new logical volume within the volume group. One can use the command to specify the name of the logical volume and to specify the logical volumes' defining characteristics, such as the size allocated to the new logical volume and the logical volume type or initial mirroring characteristics.

As shown in FIG. 5, the process begins with receiving a request at the logical volume manager to create a new logical volume (step 502). The logical volume manager receives the request and determines if a new device type (or subtype) is specified (step 504). If a new device type is not specified, then the logical volume manager adds the new device to the kernel space and assigns a default device type to the logical volume (step 506) with the process terminating thereafter. If a new device type is specified, then the logical volume manager adds the new device type to the metadata (step 508). The logical volume manager also adds the new device to the kernel space and assigns the new device type to the logical volume (step 510) with the process terminating thereafter. Once the logical volume type is determined and set, the logical volume is created. The device type can only be set at creation time, and thus this property is non-changeable for the life of the logical volume.

Specifying a new device type or subtype when creating a logical volume also allows an application, such as a database, to key off of the device type or device subtype when laying down data. The present invention allows for altering an application's historic behavior while supporting both the new behavior and the historic behavior. In addition, the present invention allows an application to set specific device types when creating logical volumes that only the application itself understands. Preventing another application from accessing the logical volume may prevent a second application from accidentally destroying the first application's data.

FIG. 6 is a detailed flow diagram of the activation sequence for a volume group at boot time or HA fail over time according to a preferred embodiment of the present invention. As shown in FIG. 6, after the logical volume property has been set, the process begins with activating the volume group (step 602). The logical volume manager reads the logical volume metadata (step 604) and determines if a new device type (or subtype) is specified (step 606) with the process terminating thereafter. If a new device type is not specified, then the logical volume manager adds the new device to the kernel space with a default device type (step 608) with the process terminating thereafter. If a new device type is specified, logical volume manager adds the new device to the kernel space with the new device type (step 610) with the process terminating thereafter.

FIG. 7 is a detailed flow diagram outlining the identification of the type and subtype of a device by an application in a preferred embodiment of the present invention. The application, before laying down data, queries the device to determine what code paths the application will use for the device. For example, the application may query the device via an ioctl that returns information about the device, including the device type and device subtype. Based on the device type and subtype information returned, run time parameters are then set within the application.

As FIG. 7 shows, the process begins with the application querying the device (step 702) and determining if the logical volume uses a special device subtype (step 704). If the application determines that the logical volume does not use a special device subtype, then the application sets the subtype to the default device subtype (step 706) with the process terminating thereafter. If the application determines that the logical volume uses a special device subtype, the application sets the device subtype to the special device subtype (step 708) with the process terminating thereafter.

Thus, the present invention provides a mechanism for allowing the device type or subtype specified during the creation of the logical volume to signal to an application that the application can perform a particular behavior. For example, a particular device type or subtype selected may signal to an application that the application, when writing data to a storage device may write data to the LVCB area within the logical volume. Normally, an application will skip over the LVCB area of the logical volume. The present invention allows the application to overwrite the metadata contained within the LVCB.

The advantages of the present invention should be apparent in view of the detailed description provided above. An application can be prevented from writing data to the LVCB area of a logical volume since the LVCB area contains configuration information for the logical volume. However, such prior methods of skipping the LVCB area may cause alignment problems with the underlying physical storage, which creates the risk of having the application corrupt its own data. In contrast, the present invention not only provides a mechanism for using the device or device subtype as a indicator to an application to behave in a certain way, such as using the device or device subtype to signal to the application not to skip the LVCB area of the logical volume. The present invention also provides the advantage of allowing an application to supply a new alternative device or device subtype to the logical volume manager. The behavior of the application is then controlled via the device or device subtype.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling the behavior of an application when storing data using a logical volume manager, comprising:

creating a logical volume;

setting a new device type for the logical volume, wherein the new device type is added to a metadata within the logical volume manager;

adding a new device with the new device type to a kernel space; and using the new device type to indicate to the application that the application may perform a particular behavior defined by the new device type, wherein the particular behavior defined by the new device type includes allowing the application to determine a location to begin writing data in a database.

2. The method of claim 1, wherein the step of creating the logical volume includes supplying the logical volume manager with a new device type for the logical volume.

3. The method of claim 1, wherein the location to begin writing data in the database includes block zero of the logical volume control block.

4. The meted of claim 1, wherein the particular behavior defined by the new device type includes allowing the application to enable a new feature within the application.

5. The method of claim 1, wherein the particular behavior defined by the new device type includes allowing the application to reduce a currently supported feature set within the application.

6. The method of claim 1, wherein the particular behavior defined by the new device type includes allowing the application to prevent older versions of the application from using the logical volume.

7. The method of claim 1, wherein the particular behavior defined by the new device type includes allowing the application to test the application's expected behavior on a different volume manager.

8. The method of claim 1, wherein the new device type set for the logical volume is non-changeable for the life of the logical volume.

9. A system for controlling the behavior of an application when storing data using a logical volume manager, comprising:
a logical volume;
a new device type set for the logical volume; and
an application, wherein the new device type set for the logical volume is used to indicate to the application that the application may perform a particular behavior defined by the new device type, wherein the particular behavior defined by the new device type includes allowing the application to determine a location to begin writing data in a database.

10. A data processing system for controlling the behavior of an application when storing data using a logical volume manager, comprising:
creating means for creating a logical volume;
setting means for setting a new device type for the logical volume, wherein the setting step includes adding the new device type to a metadata within the logical volume manager;
adding means for adding a new device with the new device type to a kernel space; and
using means for using the new device type to indicate to the application that the application may perform a particular behavior defined by the new device type, wherein the particular behavior defined by the new device type includes allowing the application to determine a location to begin writing data in a database.

11. The data processing system of claim 10, wherein the creating means supplies the logical volume manager with a new device type for the logical volume.

12. The data processing system of claim 10, wherein the location to begin writing data in the database includes block zero of the logical volume control block.

13. The data processing system of claim 10, wherein the particular behavior defined by the new device type includes allowing the application to enable a new feature within the application.

14. The data processing system of claim 10, wherein the particular behavior defined by the new device type includes allowing the application to reduce a currently supported feature set within the application.

15. The data processing system of claim 10, wherein the particular behavior defined by the new device type includes allowing the application to prevent older versions of the application from using the logical volume.

16. The data processing system of claim 10, wherein the particular behavior defined by the new device type includes allowing the application to test the application's expected behavior on a different volume manager.

17. A computer program product tangibly embodied in a tangible computer readable medium for controlling the behavior of an application when storing data using a logical volume manager, comprising:
first instructions for creating a logical volume;
second instructions for setting a new device type for the logical volume, wherein the setting step includes adding the new device type to a metadata within the logical volume manager;
third instructions for adding a new device with the new device type to a kernel space; and
fourth instructions for using the new device type to indicate to the application that the application may perform a particular behavior defined by the new device type, wherein the particular behavior defined by the new device type includes allowing the application to determine a location to begin writing data in a database.

18. The computer program product of claim 17, wherein the first instructions include instructions for supplying the logical volume manager with a new device type for the logical volume.

19. The computer program product of claim 17, wherein the location to begin writing data in the database includes block zero of the logical volume control block.

20. The computer program product of claim 19, wherein the particular behavior defined by the new device type includes allowing the application to enable a new feature within the application.

21. The computer program product of claim 19, wherein the particular behavior defined by the new device type includes allowing the application to reduce a currently supported feature set within the application.

22. The computer program product of claim 19, wherein the particular behavior defined by the new device type includes allowing the application to prevent older versions of the application from using the logical volume.

23. The computer program product of claim 19, wherein the particular behavior defined by the new device type includes allowing the application to test the application's expected behavior on a different volume manager.

* * * * *